United States Patent
Mitra et al.

(10) Patent No.: US 12,330,118 B2
(45) Date of Patent: Jun. 17, 2025

(54) SYSTEM AND METHOD FOR ANGSTROM CONFINEMENT OF TRAPPED IONS

(71) Applicants: Sushanta Mitra, Waterloo (CA); Na Young Kim, Waterloo (CA); Naga Siva Kumar Gunda, Waterloo (CA); Sunil Walia, Waterloo (CA); Enrique Ignacio Wagemann, San Pedro de la Paz (CL)

(72) Inventors: Sushanta Mitra, Waterloo (CA); Na Young Kim, Waterloo (CA); Naga Siva Kumar Gunda, Waterloo (CA); Sunil Walia, Waterloo (CA); Enrique Ignacio Wagemann, San Pedro de la Paz (CL)

( * ) Notice: Subject to any disclaimer, the term of this patent is extended or adjusted under 35 U.S.C. 154(b) by 411 days.

(21) Appl. No.: 17/932,651

(22) Filed: Sep. 15, 2022

(65) Prior Publication Data
US 2023/0081674 A1  Mar. 16, 2023

Related U.S. Application Data

(63) Continuation of application No. PCT/CA2021/050450, filed on Apr. 1, 2021.
(Continued)

(51) Int. Cl.
*B01D 61/42* (2006.01)
*B01D 63/08* (2006.01)
(Continued)

(52) U.S. Cl.
CPC ......... *B01D 61/427* (2013.01); *B01D 63/088* (2013.01); *B01D 67/0062* (2013.01);
(Continued)

(58) Field of Classification Search
CPC .. B01D 57/02; B01D 61/427; B01D 71/0211; B01D 63/088; B01D 67/0062;
(Continued)

(56) References Cited

U.S. PATENT DOCUMENTS 6,048,734 A * 4/2000 Burns ................. F16K 99/0061
436/180
6,136,171 A * 10/2000 Frazier ................ B81C 1/00357
209/127.1
(Continued)

FOREIGN PATENT DOCUMENTS

CA       2672525 C       1/2018
JP       2014218715 A    11/2014

OTHER PUBLICATIONS

Xie et al., "Ion transport in graphene nanofluidic channels," Nanoscale, 2016, 8, 19527 with supplemental information (Year: 2016).*
(Continued)

*Primary Examiner* — Alexander S Noguerola
(74) *Attorney, Agent, or Firm* — Bhole IP Law; Marc Lampert

(57) ABSTRACT

There is provided a system and method for angstrom confinement of trapped ions. The method including: receiving water molecules and ionic compounds in a first reservoir, an angstrom confinement assembly is positioned between the first reservoir and a second reservoir, the angstrom confinement assembly defining angstrom conduits; and repeatedly applying an electric field across a first electrode and a second electrode, the first electrode on a same side of the angstrom confinement assembly as the first reservoir and the second electrode on a same side of the angstrom confinement assembly as the second reservoir, the electric field applied such that, when the electric field is applied, positive ions of the ionic compounds are induced to flow through the angstrom conduits, and wherein, when the electric field is not
(Continued)

applied, water molecules flow into the angstrom conduits due to capillary forces to confine the positive ions in the angstrom conduits.

12 Claims, 21 Drawing Sheets

Related U.S. Application Data

(60) Provisional application No. 63/100,818, filed on Apr. 3, 2020.

(51) Int. Cl.
| | |
|---|---|
| *B01D 67/00* | (2006.01) |
| *B01D 71/02* | (2006.01) |
| *B01L 3/00* | (2006.01) |
| *G05D 7/06* | (2006.01) |
| *B82Y 10/00* | (2011.01) |
| *G01N 27/447* | (2006.01) |

(52) U.S. Cl.
CPC ...... *B01D 71/0211* (2022.08); *B01L 3/50273* (2013.01); *B01L 3/502761* (2013.01); *G05D 7/0694* (2013.01); *B01D 2311/2603* (2013.01); *B01D 2313/501* (2022.08); *B01D 2325/02832* (2022.08); *B01L 2200/0647* (2013.01); *B01L 2300/0645* (2013.01); *B01L 2300/16* (2013.01); *B01L 2400/0406* (2013.01); *B01L 2400/0415* (2013.01); *B01L 2400/0418* (2013.01); *B82Y 10/00* (2013.01); *G01N 27/44791* (2013.01)

(58) Field of Classification Search
CPC .... B01D 2313/501; B01D 2325/02832; B01D 2311/2603; B01D 2200/0647; B01D 2300/0645; G01N 27/44791; B01L 3/50723; B01L 3/502761; B01L 2300/16; G05D 7/0694; B82Y 00/00
See application file for complete search history.

(56) References Cited

U.S. PATENT DOCUMENTS

| | | | |
|---|---|---|---|
| 8,426,809 | B2 | 4/2013 | Kumph |
| 9,368,336 | B2 | 6/2016 | Xu et al. |
| 10,242,859 | B2 | 3/2019 | Kim et al. |
| 10,651,025 | B1 | 5/2020 | Silveira et al. |
| 2006/0273251 | A1 | 12/2006 | Verbeck et al. |
| 2007/0040113 | A1 | 2/2007 | Monroe et al. |
| 2014/0231751 | A1* | 8/2014 | Wada ................ H01L 21/3215 257/29 |
| 2014/0284798 | A1* | 9/2014 | Miyazaki .......... H01L 23/53276 257/750 |

OTHER PUBLICATIONS

Zhang, "Molecular dynamics simulation of continuous nanoflow transport through the uneven wettability channel," AIP Advances 8, 015111 (2018) (Year: 2018).*
Wang et al., "Voltage-Gated Ion Transport in TwoDimensional Sub-1 nm Nanofluidic Channels," ACS Nano 2019, 13, 11793-11799 with supplementary information (Year: 2019).*
Kargar et al., "Influence of electric fields on the efficiency of multilayer graphene membrane," Journal of Molecular Modeling (2018) 24: 241 (Year: 2018).*
Zhou et al. "Field-enhanced selectivity in nanoconfined ionic transport," Nanoscale, 2020, 12, 6512 (Year: 2020).*
Baoxia Mi, "Graphene Oxide Membranes for Ionic and Molecular Sieving," Science vol. 343 Feb. 14, 2014 (Year: 2014).*
De Aquino et al., "Ionized water confined in graphene nanochannels," Phys.Chem.Chem.Phys., 2019, 21, 9285 (Year: 2019).*
Radha et al., Letter—"Molecular transport through capillaries made with atomic-scale precision," Nature | vol. 538 | Oct. 13, 2016, pp. 222-225 (Year: 2016).*
Frisenda et al., "Recent progress in the assembly of nanodevices and van der Waals heterostructures by deterministic placement of 2D materials," Chem. Soc. Rev., 2018, 47, 53 (Year: 2018).*
International search report for PCT application No. PCT/CA2021/050450, CIPO, search completed: Jun. 10, 2021, mailed: Jun. 10, 2021.
Notice of allowance for U.S. Appl. No. 17/221,174, USPTO, notice date: Aug. 9, 2021.
Office action for U.S. Appl. No. 17/221,174, USPTO, notification date: Jun. 24, 2021.
Written opinion of the international searching authority for PCT application No. PCT/CA2021/050450, CIPO, opinion completed: Jun. 10, 2021, mailed: Jun. 10, 2021.
Blatt, R., et al., "Quantum simulations with trapped ions.", Nature Phys 8, 277-284 (2012).
Britton, Joseph W., et al., "Engineered two-dimensional Ising interactions in a trapped-ion quantum simulator with hundreds of spins.", Nature 484, 489-492 (2012).
Bruzewicz, Colin D., et al., "Trapped-ion quantum computing: Progress and challenges", C. D. Bruzewicz, J. Chiaverini, R. McConnell and J. M. Sage, Applied Physics Reviews, 6(2), 021314, 2019.
Drewsen, M., et al., "Large Ion Crystals in a Linear Paul Trap", Physical Review Letters, 81(14), p. 2878, 1998.
Kim, K., et al., "Quantum simulation of frustrated Ising spins with trapped ions", Nature 465, 590-593 (2010).
Porras, D., et al., "Effective Quantum Spin Systems with Trapped Ions", Physical Review Letters, 92(20), 207901, 2004.
Radha, B., et al., "Molecular transport through capillaries made with atomic-scale precision.", Nature 538, 222-225 (2016).
Raizen, M. G., et al., "Ionic crystals in a linear Paul trap", Physical Review A, 45(9), 6493, 1992.
Stahl, S., et al., "A planar Penning trap", The European Physical Journal D≤Atomic, Molecular, Optical and Plasma Physics, 32(1), 139-146, 2005.
Extended European Search Report for application No. EP21779787.7, EPO, dated: Feb. 27, 2024.
Esfandiar, A., et al., "Size effect in ion transport through angstrom-scale slits", Science, vol. 358, No. 6362, Oct. 27, 2017 (Oct. 27, 2017), pp. 511-513, XP055817580, US ISSN: 0036-8075, DOI: 10.1126/science.aan5275 Retrieved from the Internet: URL:https://science.sciencemag.org/content/sci/358/6362/511.full. pdf.
Nazari, Masoumeh, et al., "Supporting Information for Surface Tension Nanogates for Controlled Ion Transport", May 19, 2020 (May 19, 2020), XP093131649, Retrieved from the Internet: URL:https://pubs.acs.org/doi/full/10.1021/acsanm.0c01304 [retrieved on Feb. 15, 2024].
Nazari, Masoumeh, et al., "Surface Tension Nanogates for Controlled Ion Transport", ACS Applied Nano Materials, vol. 3, No. 7, May 19, 2020 (May 19, 2020), pp. 6979-6986, XP093131647, ISSN: 2574-0970, DOI: 10.1021/acsanm.0c01304.
Wang, Yuqi, et al., "Voltage-Gated Ion Transport in Two-Dimensional Sub-1 nm Nanofluidic Channels", ACS Nano, vol. 13, No. 10, Sep. 17, 2019 (Sep. 17, 2019), pp. 11793-11799, XP093131760, US ISSN: 1936-0851, DOI: 10.1021/acsnano.9b05758.
Xie, Quan, et al., "Ion transport in graphene nanofluidic channels", Nanoscale, vol. 8, No. 47, Nov. 8, 2016 (Nov. 8, 2016), pp. 19527-19535, XP093131748, United Kingdom ISSN: 2040-3364, DOI: 10.1039/C6NR06977K Retrieved from the Internet: URL:https://pubs.rsc.org/en/content/articlepdf/2016/nr/c6nr06977k.

* cited by examiner

SYSTEM AND METHOD FOR ANGSTROM CONFINEMENT OF TRAPPED IONS

TECHNICAL FIELD

The present invention relates generally to ion traps; and more particularly, to a system and method for angstrom confinement of trapped ions.

BACKGROUND

In the pursuit of building quantum computers during the last few decades, different techniques have been developed; such as superconducting loops, trapped ions, spin-based quantum dots, topological qubits, coupled quantum wire, diamond vacancies and metallic-like carbon nanospheres. Of these approaches, on the forefront of advancement for quantum computing is the use of laser-cooled trapped ions in a gas phase at lower pressures. A substantial challenge to this approach is scalability of harnessing many such trapped ions; due to, for example, the requirement for large-scale expensive instruments and multiple laser systems.

SUMMARY

In an aspect, there is provided a system for angstrom confinement of trapped ions, the system comprising: an angstrom confinement assembly positioned in a microchannel between a first reservoir and a second reservoir, the angstrom confinement assembly comprising a plurality of spacers defining angstrom conduits, wherein water molecules and ionic compounds are received in the first reservoir; a first electrode positioned in or adjacent to the microchannel proximate the first reservoir; and a second electrode positioned in or adjacent to the microchannel proximate the second reservoir, the first electrode and the second electrode receive an electric field such that, when the electric field is applied, positive ions of the ionic compounds are separated from negative ions of the ionic compounds by inducing the positive ions to flow through the angstrom conduits, and wherein, when the electric field is not applied, water molecules flow into the angstrom conduits due to capillary forces to confine the positive ions in the angstrom conduits.

In a particular case of the system, the system further comprising: a first component defining the first reservoir and the second reservoir; and a second component bonded to the first component, the first component and the second component defining the microchannel therebetween for connecting the first reservoir and the second reservoir.

In another case of the system, the first component and the second component each comprise substrates comprised of Silicon Dioxide coated Silicon or Silicon Nitride coated Silicon.

In yet another case of the system, the angstrom confinement assembly comprises a plurality of atomically flat spacers with apertures in the layers defining the angstrom conduits.

In yet another case of the system, the spacers are comprised of hexagonal Boron Nitride (hBN).

In yet another case of the system, the spacers are comprised of graphene.

In yet another case of the system, the angstrom confinement assembly is fabricated by stacking the atomically flat spacers together using van der Waals forces.

In yet another case of the system, the angstrom confinement assembly is patterned using reactive-ion etching (RIE).

In yet another case of the system, the ionic compounds are Cesium Chloride or Sodium Chloride.

In yet another case of the system, the electric field is received such that the first electrode operates as an anode and the second electrode acts as a cathode.

In another aspect, there is provided a method for angstrom confinement of trapped ions, the method comprising: receiving water molecules and ionic compounds in a first reservoir, the first reservoir in fluid communication with a second reservoir, an angstrom confinement assembly is positioned between the first reservoir and the second reservoir, the angstrom confinement assembly defining angstrom conduits; and repeatedly applying an electric field across a first electrode and a second electrode, the first electrode on a same side of the angstrom confinement assembly as the first reservoir and the second electrode on a same side of the angstrom confinement assembly as the second reservoir, the electric field applied such that, when the electric field is applied, positive ions of the ionic compounds are induced to flow through the angstrom conduits, and wherein, when the electric field is not applied, water molecules flow into the angstrom conduits due to capillary forces to confine the positive ions in the angstrom conduits.

In a particular case of the method, application of the electric filed causes positive ions to separate from negative ions in the ionic compounds due to electroosmotic flow.

In another case of the method, the electric field is repeatedly applied until a predetermined quantity of positive ions are trapped in the angstrom conduits.

In yet another case of the method, the positive ions are received by the second reservoir after flowing through the angstrom conduits.

In yet another case of the method, one or more measurements are performed on the confined positive ions when the electric field is not applied.

In yet another case of the method, the angstrom confinement assembly comprises a plurality of atomically flat spacers with apertures in the layers defining the angstrom conduits.

In yet another case of the method, the ionic compounds are Cesium Chloride or Sodium Chloride.

These and other aspects are contemplated and described herein. It will be appreciated that the foregoing summary sets out representative aspects of systems and methods and assists skilled readers in understanding the following detailed description.

DESCRIPTION OF THE DRAWINGS

A greater understanding of the embodiments will be had with reference to the Figures, in which.

DETAILED DESCRIPTION

Figure 1:
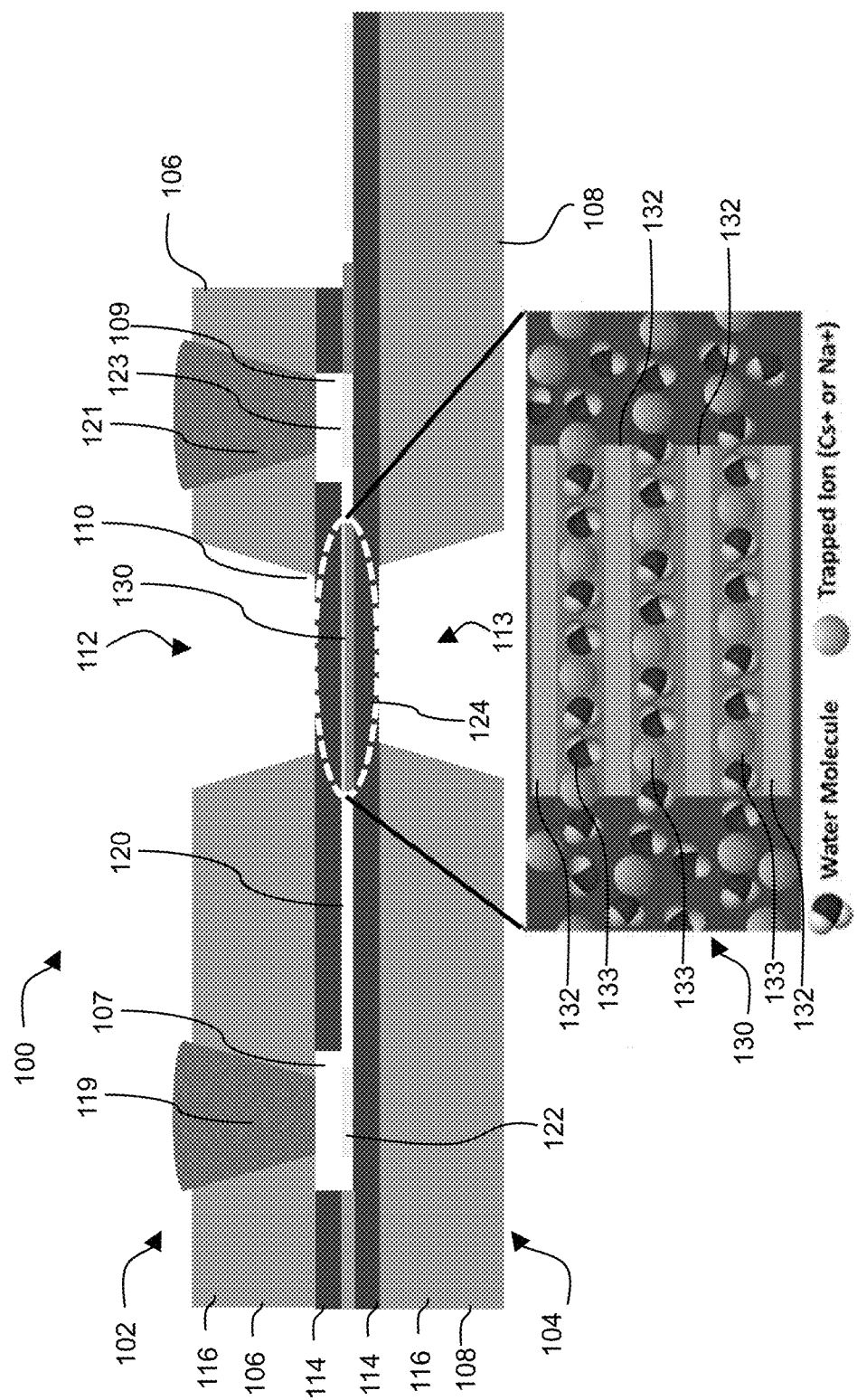
FIG. 1 is a diagram of a system for angstrom confinement of trapped ions, in accordance with an embodiment.

Embodiments will now be described with reference to the figures. For simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Advantageously, embodiments of the present disclosure provide a scalable infrastructure that can enable utilization of multiple quantum bits ("qubits") to perform quantum computational tasks. The present embodiments provide a system that provides a multiple trapped-ion platform in liquid phase; using a narrow flow conduit to selectively transport water molecules while controlling movement of ions. The present embodiments control ions that are trapped inside an artificial one-dimensional (1-D) water channel by maintaining spacing between ions through a linear array of water molecules; thereby achieving a multi-qubit trapped-ion system with high fidelity and coherence. The present embodiments advantageously have a relatively small footprint compared to existing systems.

Advantageously, the present embodiments provide a multiple trapped-ion platform in liquid phase. The ions are extracted from an electrolyte using electroosmotic flow within hybrid silicon nitride-silicon-glass microchannel. In addition, in an embodiment, van der Waals assembly is utilized by sandwiching an atomically flat hexagonal Boron Nitride (hBN) spacer between two cleaved graphite layers, thereby obtaining precise angstrom-order channel height to trap ions. The distance between the trapped-ions is manipulated, by introducing water molecules as spacers within the one-dimensional (1-D) nanofluidic channel.

Other approaches for trapped-ion quantum devices generally require extensive laser sources to cool them down and to trap the ions at a specific location. In addition, such approaches generally require sophisticated design of electrodes, and for scalable trapped-ion devices, complex micro/nanofabrication techniques to fabricate trapped-ion chips. Advantageously, the present embodiments use water molecules as spacers within the angstrom height nanofluidic channel to, at least, overcomes the technical limitations of the other approaches. Also advantageously, the present embodiments are scalable, such that a large number of ions can be trapped at various locations within the channels.

Generally, in trapped-ion quantum systems, qubits are initialized and stored in the stable electronic state of each ion(s). They are confined/trapped in a preferred orientation and suspended in a perfect vacuum using electric, magnetic and/or oscillating fields. By specific wavelength lasers, individual ions are cooled, manipulated and their qubit states could be entangled with appropriate coherence time. Quantum information is processed and transmitted by means of the combined quantized motion of ions in the interconnected ion traps. Interconnected ion traps can transmit quantum information from one trap to another. Two types of trapped ion systems (also called ion traps) are Paul traps and Penning traps. Paul traps (also called radiofrequency traps) can trap the charged ions using saddle-shaped electric fields generated by the combination of static and oscillating electric potential when applied on quadrupole electrodes. Penning traps can trap the ions at specified locations using the combination of non-uniform quadruple electric field and a uniform axial magnetic field. In the context of quantum information processing in a Paul trap, the ions form a linear array in which the spacing is determined by the balance between the applied electric field and the mutual Coulomb repulsion.

In some cases, traps can be manufactured on a microchip; for example, a quantum charge-coupled device (QCCD) which has the interconnected network of electrodes with designated areas for storing and manipulating qubits. A non-uniform electric field created by electrodes can trap ions in specific zones as well as move the ions from one zone to another zone via transport channels. Generally, trapped-ion systems for quantum hardware are being developed to trap the ions in the presence of a perfect vacuum (gas phase at lower pressures), which requires an energy intensive large vacuum pumping system. Therefore, such ion trap systems use ionization of neutral precursor to load the ion traps with one or more ions. In other cases, a hot, neutral atomic vapor exposed to electron bombardment was used for loading the ions into the ion trap systems. Typically, the ions with more atomic mass units have been used in these systems. There are substantial challenges for trapped ion quantum computing systems; for example, initialization of the ion's motional states, short lifespan of the phonon states, and exclusion of decoherence (loss of phase relationship between different states). Moreover, manipulating multiple ions generally require fabrication of complex trapping systems coupled with an elaborate laser system and bulky instrumentation.

In the discipline of microfluidics and nanofluidics, an approach for separating and trapping ions of interest within an electrolyte can be achieved using an electroosmotic flow. In electroosmotic flow, the charged ions are separated and transported due to the interaction of ions with externally applied electric fields. In some cases, angstrom scale (Å) precision conduits (flow passages), based on van der Waals assembly, can be used. For van der Waals (vdW) heterostructures, they are typically held together by weaker van der Waals forces; forming a single material with different properties. As they are weaker in nature, the material can be detached from one another and used as single atomic layers. The angstrom scale (Å) precision conduits, forming 'one-dimensional' ("1-D") confinements, can be used for devices with one atomic plane precision for water permeation and rejection of hydrated ions, proton transport, and the like. In the present embodiments, an angstrom level 1-D conduit is advantageously used to separate and trap ions of interest. Trapped ions can then be used for quantum computing purposes by manipulating the electronic states of ion qubits.

In the present disclosure, for the purposes of illustration, Cesium (Cs+) and Sodium (Na+) are described as model ions; however, any suitable ionizable elements can be used. The ionic radius of Cs+ and Na+ ions are 1.67 Å and 1.02 Å, respectively. Conventionally, Cs+ and Na+ ions have not been used for the realization of trapped-ion qubits. Advantageously, these ions can easily be separated from the cesium chloride and sodium chloride electrolytes using electroosmotic flow. Therefore, the present embodiments provide, at least, a unique approach for trapping such ions inside an angstrom conduit. The present embodiments enable the realization of multiple trapped-ion platforms and also, at the same time, provides precise control of channel height on an angstrom level operational length scale.

Figure 2:
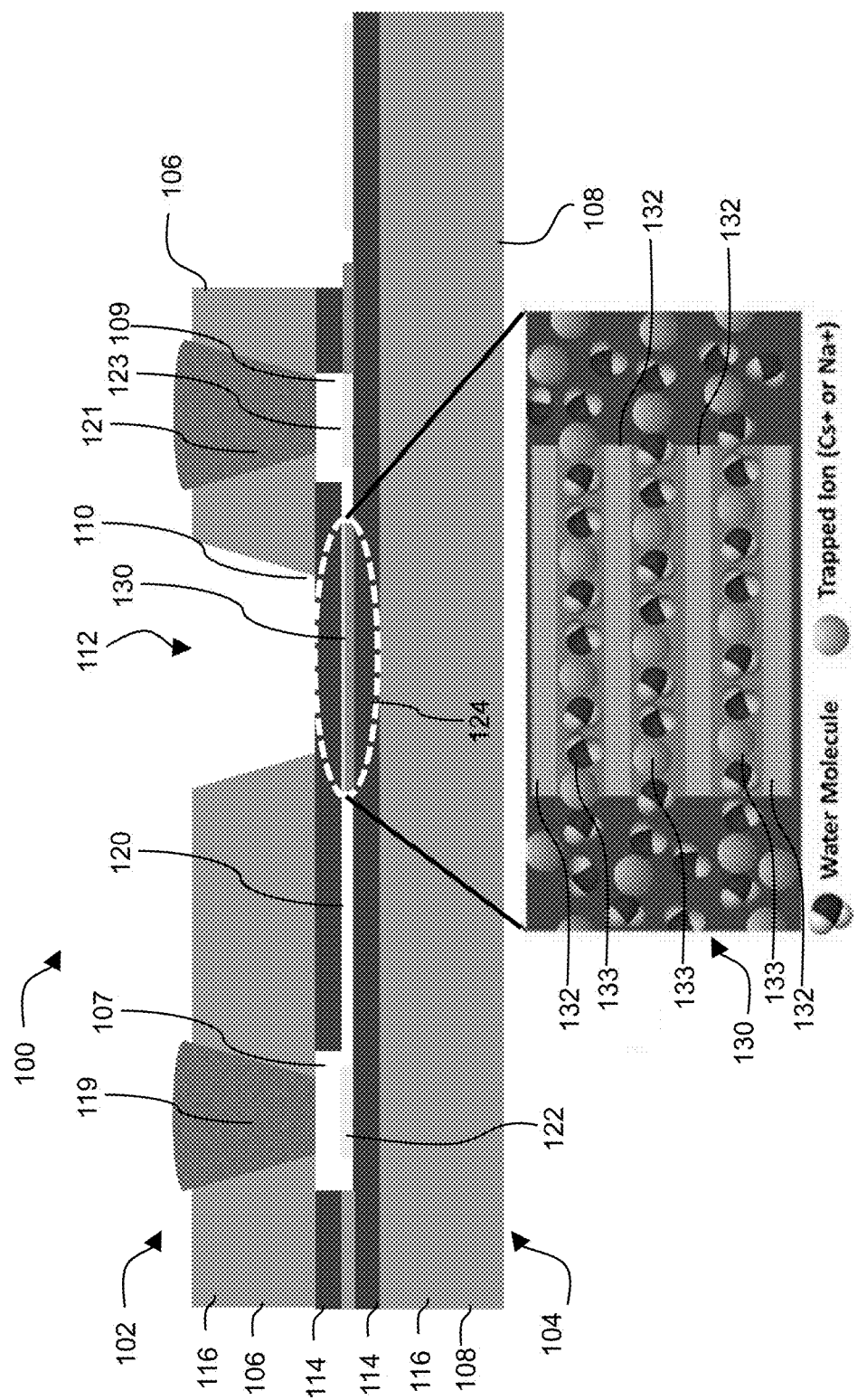
FIG. 2 is a diagram of a system for angstrom confinement of trapped ions, in accordance with another embodiment.

FIGS. 1 and 2 illustrate a cutaway side-view of a diagram of a system 100 for angstrom confinement of trapped ions, in accordance with two respective particular embodiments. Advantageously, in an example, an overall footprint of the system 100 has been fabricated to be around 4 mm×5.8 mm and less than one millimeter thick.

The system 100 comprises a first component 102 and a second component 104, bonded together by, for example, anodic bonding. In further cases, the first component 102 and the second component 104 can be both formed from a unitary structure. The first component 102 comprises one or more first substrates 106 and the second component 104 comprises one or more second substrates 108. In an example, each substrate 106, 108 is comprised of Silicon Nitride 114 coated Silicon 116. The one or more first substrates 106 define a first reservoir 107 and a second reservoir 109. In further cases, the reservoir can be defined by the one or more second substrates 108, or a combination of the one or more first substrates 106 and the one or more second substrates 108. A first reservoir aperture 119 can provide access to the first reservoir 107 and a second reservoir aperture 121 can provide access to the second reservoir 109. As shown in FIGS. 1 and 2, the first reservoir aperture 119 and the second reservoir aperture 121 can accommodate a plug to close the respective aperture 119, 121 when access is not required.

In the embodiment of FIG. 1, the first component 102 defines a first measurement accessway 112 and the second component 104 defines a second measurement accessway 113, each for optical access for measurement purposes. In the embodiment of FIG. 2, only the first measurement accessway 112 in the first component 102 is present. In further embodiments, only the second measurement accessway 113 can be present.

The one or more first substrates 106 together with the one or more second substrates 108 define a microchannel 120 therebetween connecting the first reservoir 107 and the second reservoir 109. A fist planar microelectrode 122 is positioned in or adjacent to the microchannel 120 at a position that is in or proximate to the first reservoir 107 and a second microelectrode 123 is positioned in or adjacent to the microchannel 120 at a position that is in or proximate to the second reservoir 109. As described herein, the first microelectrode 122 and the second microelectrode 123 cooperate to enable electroosmotic flow.

The system 100 further comprises an angstrom confinement assembly 130, positioned between the first component 102 and the second component 104, in the microchannel 120 between the first reservoir 107 and the second reservoir 109. A diagram of the angstrom confinement assembly 130 is illustrated in the inset of FIGS. 1 and 2. The angstrom confinement assembly 130 comprises a plurality of spacers 132, each comprising a plurality of atomically flat hexagonal Boron Nitride (hBN) layers (or in other cases, graphene layers). The layers 132 comprise patterning that define angstrom conduits 133.

The angstrom confinement assembly 130 can be fabricated using van der Waals assembly and the patterning of the atomically flat layers. To fabricate the angstrom confinement assembly 130, two-dimensional (2D) layered materials, such as the graphite or hBN, are stacked together by van der Waals forces. These atomic thick layers can comprise the spacers 132 which define angstrom conduits 133 therebetween; with the conduits' heights controlled by the number of layers. These layers can be first patterned on the substrates using photolithography and later transferred to a specific area on a support substrate using polymers such as PVA, PMMA, or the like. Advantageously, van der Waals assembly of atomically flat crystals provides precise control of conduit height, which is often unrealizable in other nano-fabrication techniques.

The inset of FIGS. 1 and 2 show a top-view of trapped-ions (Cs+ or Na+) between single-file water molecules inside the angstrom confinement assembly 130. The angstrom confinement assembly 130 acts as a collection of angstrom conduits 133, acting as nanocapillaries, providing trapping of ions and single-file water molecules, as described herein. Various suitable fabrication processes can be used to fabricate the components of the system 100, for example, photolithography, electron beam lithography, reactive ion etching, and/or wet etching. While the present embodiments describe Silicon Dioxide and Silicon Nitride substrate, it is understood that any suitable substrate material can be used; for example, selected based on high temperature strength, wear resistance, fracture toughness, oxidation resistance, and the like. Further, the layers of the angstrom confinement assembly 130 can be any suitable material, for example, graphene, hBN, $MoS_2$, $WSe_2$, and the like.

Figure 3:
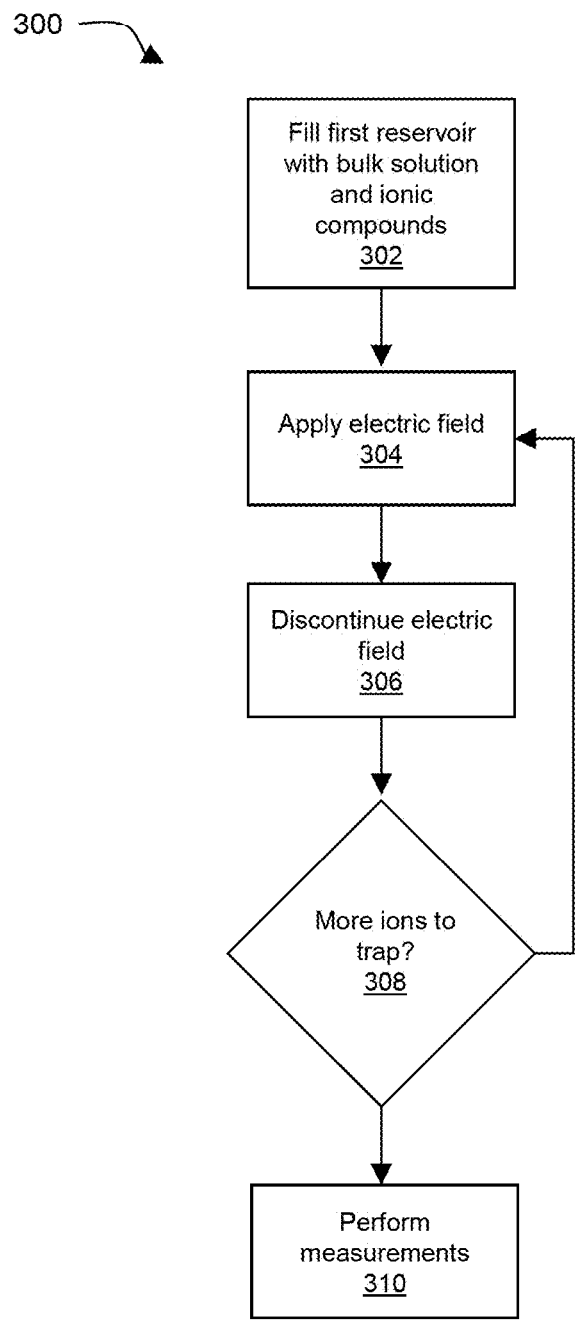
FIG. 3 is a diagrammatic flow diagram of a method for angstrom confinement of trapped ions, in accordance with an embodiment.
Figure 13:
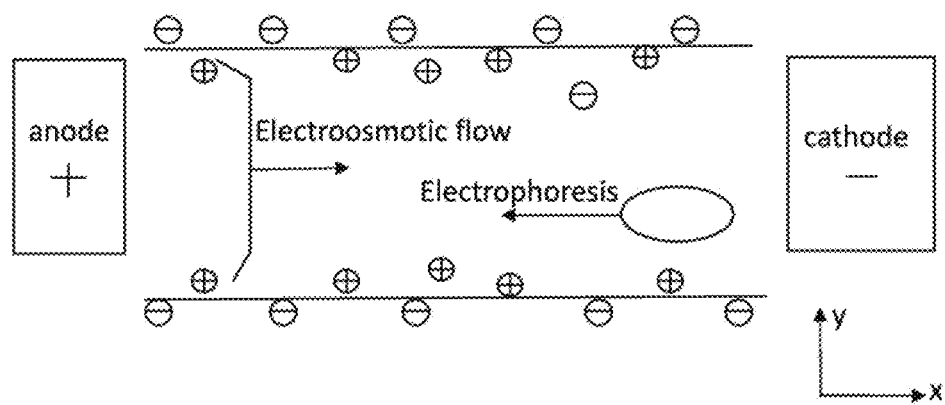
FIG. 13 is a diagram of an example electroosmosis process.

FIG. 3 illustrates an embodiment of a method for angstrom confinement of trapped ions 300. A bulk solution phase used in the present embodiments are water molecules, which will be transported through the angstrom confinement assembly 130 using capillary forces; however any suitable bulk solution phase can be used. An ionic compound in the present embodiments comprises Cesium Chloride or Sodium Chloride; however, any suitable ionic compound can be used. At block 302, the first reservoir 107 receives the water molecules and the ionic compounds. In some cases, both the water molecules and the ionic compounds can be received together, such as an electrolyte. In further cases, the water molecules and the ionic compounds can be received separately. At block 304, the first electrode 122 and the second electrode 123 receive an electric potential to generate an electric field between them, whereby the first electrode 122 acts as an anode and the second electrode 123 acts as a cathode. The electric field causes the positive and negative ions to undergo electroosmosis. As illustrated in the diagram of FIG. 13, electroosmosis cause the positive ions to move within the microchannel 120 and the angstrom conduits 133 towards the cathode located proximate the second reservoir 109. Thus, the applied electric field results in only positive ions entering the angstrom confinement assembly 130. The positive ions get trapped in the angstrom confinement assembly 130, or enter the second reservoir 109 (and/or the microchannel 120 proximate to the second reservoir 109). The negative ions remain at or proximate to the first reservoir 107.

In the present embodiments, transport of single-file water molecules can be used for angstrom confinement of the positive ions. At block 306, the electric field is discontinued. When the electric field is discontinued, water molecules flow into the angstrom conduits due to capillary action. At block 308, if more ions are to be concurrently trapped in the angstrom confinement assembly 130, the electric field is applied and discontinued repeatedly. If there are no more ions to be concurrently trapped in the angstrom confinement assembly 130, at block 310, measurements or other operations can then be performed on the trapped ions. In some cases, the amount (or approximate amount or average amount) of positive ions to be concurrently trapped is predetermined. In some cases, the amount of water molecule spacers between successive positive ions in each angstrom conduit can be predetermined; and can be in the range of one water molecule to any number of suitable water molecule spacers.

In this way, positive ions will be trapped in between the one or more water molecules (in single-file) by applying and discontinuing the suitable electric field between the two electrodes. This application of the electric field allows transport of positive ions from the first reservoir 107 to the angstrom conduits 133 in the angstrom confinement assembly 130 alternately between single-file water molecules. Advantageously, one or more single-file linear chains of water molecules can act as spacers between the trapped ions, enabling reliable quantum entanglement, but also act as messengers for positive ions in the context of gate teleportation between two successive qubits of positive ions. While various other approaches allow for Angstrom flows of water molecules, such as those found in nature with respect to Aquaporin membrane proteins, the present embodiments advantageously provide angstrom level confinement of positive ions using the linear chains of water molecules in the angstrom conduits.

When specific water molecules have permeated, the electrical field is applied to enable a single ion to move inside a pore space inside of the angstrom conduit 133. When an ion enters the angstrom conduit 133, the electrical field is turned off, thereby allowing only water molecules to permeate through the angstrom conduit 133 again. Water molecules in a normal state create tetrahedral motifs, with H—O—H bond angle around 104.5°. However, under such extreme angstrom confinement, they form single-file water molecules that permeate inside the pore using capillary forces.

In an example, the number of positive cesium ions (Cs+ ions) per $nm^2$, or Cs+ density ($\rho_s$), can be determined by computing the average number of Cs+ ions inside the angstrom conduit over time. An area of 3.0 nm (x) by 3.48 nm (y) can be used in an illustrative calculation shown in the below table. The number of Cs+ ions inside this sub-area is computed every 20 ps. The average number of Cs+ is divided by this area (10.44 $nm^2$). The $\rho_s$ is computed only for the range of applied electric field (E), where a linear response is obtained; for higher E than the ones presented in the below table, the ion flux depends non-linearly with E thus are not considered in this calculation.

| E (V/Å) | $\rho_s$ ($nm^{-2}$) |
|---|---|
| 0.001 | 0.076 |
| 0.00175 | 0.077 |
| 0.0025 | 0.068 |
| 0.00325 | 0.071 |
| 0.004 | 0.063 |

The obtained values, shown in the above table, range between 0.063 $nm^{-2}$ and 0.077 $nm^{-2}$; thus, these values can be considered to estimate the number of water molecules between Cs+ ions. Moreover, these values suggest that each Cs+ occupies an area between 13 $nm^2$ and 15.9 $nm^2$. By considering these areas, a distance can be estimated such that the distance between two Cs+ ions ($r_{Cs-Cs}$) should lie between 3.6 nm and 4 nm. The density of water molecules inside the angstrom conduit was obtained to be $\rho_s$ of ca. 11 $nm^{-2}$. This value suggests that each water molecule occupies an area of 0.091 $nm^2$; thus, the average distance between two water molecules ($r_{O-O}$) is 0.301 nm. The distance between a Cs+ ion and water molecules is obtained using a hydration radius ($r_{Cs-O}$) of ca. 0.3 nm. The number of water molecules ($n_{H2O}$) between Cs+ ions is estimated as:

$$n_{H2O} \approx \frac{(r_{Cs-Cs} - 2r_{O-O})}{r_{Cs-O}} + 1$$

For the two $\rho_s$, the estimated number of water molecules between Cs+ ions are:

| $\rho_s$ ($nm^2$) | $n_{H2O}$ |
|---|---|
| 0.063 | 12 |
|  | 11 |

While the illustrated embodiments of the system 100 show a single microchannel 120 and a single angstrom confinement assembly 130, it is understood that the system 100 can include multiple microchannels 120 and multiple assemblies 130 located between the first reservoir 107 and the second reservoir 109, or between other reservoirs. Additionally, it is understood that the other microchannels 120 and assemblies 130 can be oriented in other directions and/or planes. Additionally, while the present embodiments describe positive ions flowing into the angstrom conduits, it is understood that the polarity of the electric field could be changed such that negative ions are induced to flow into the angstrom conduits.

Figure 4:
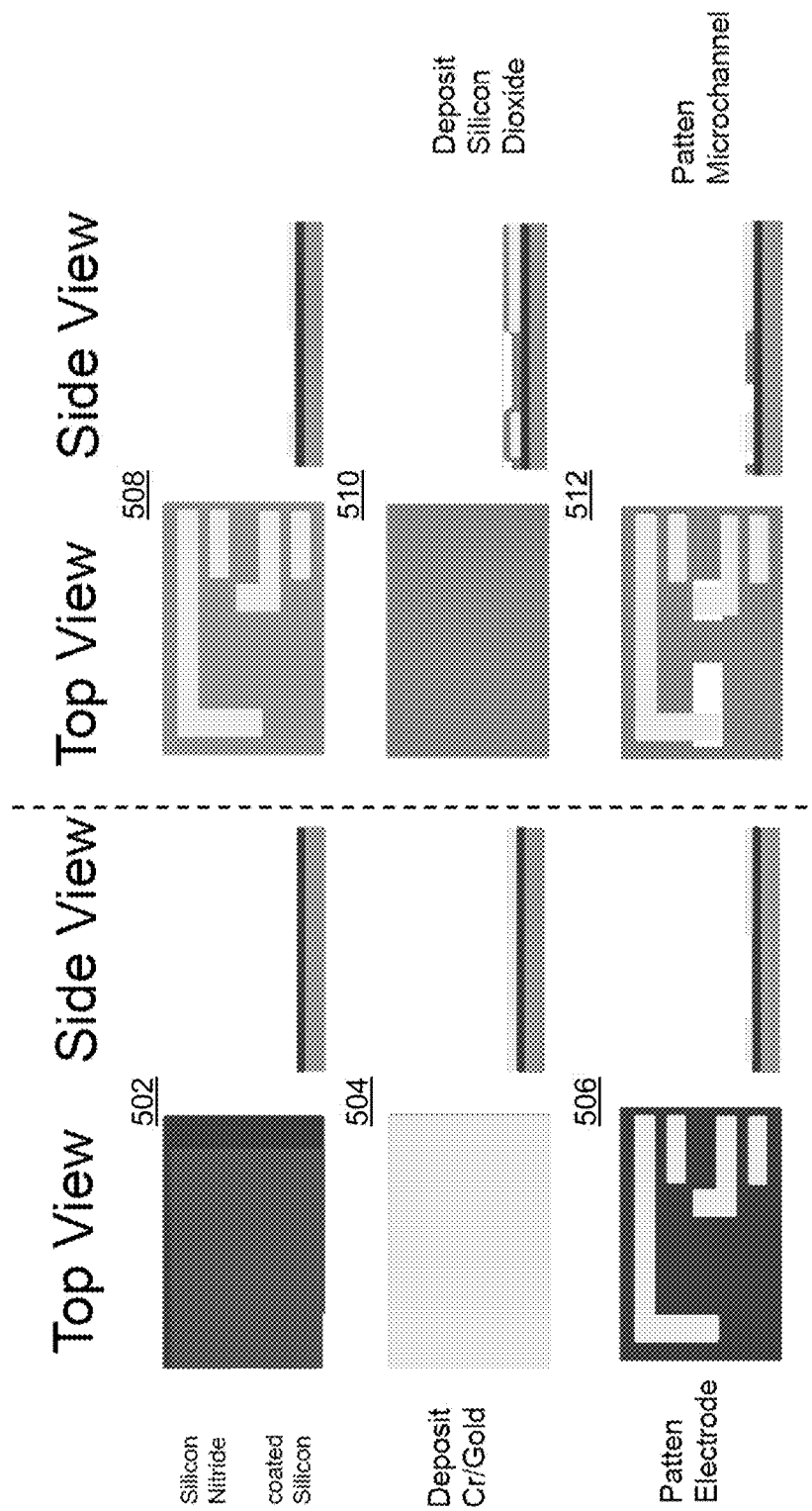
FIGS. 4 and 5 are diagrammatic illustrations of fabrication of a second component, in accordance with the system of FIGS. 1 and 2.
Figure 5:
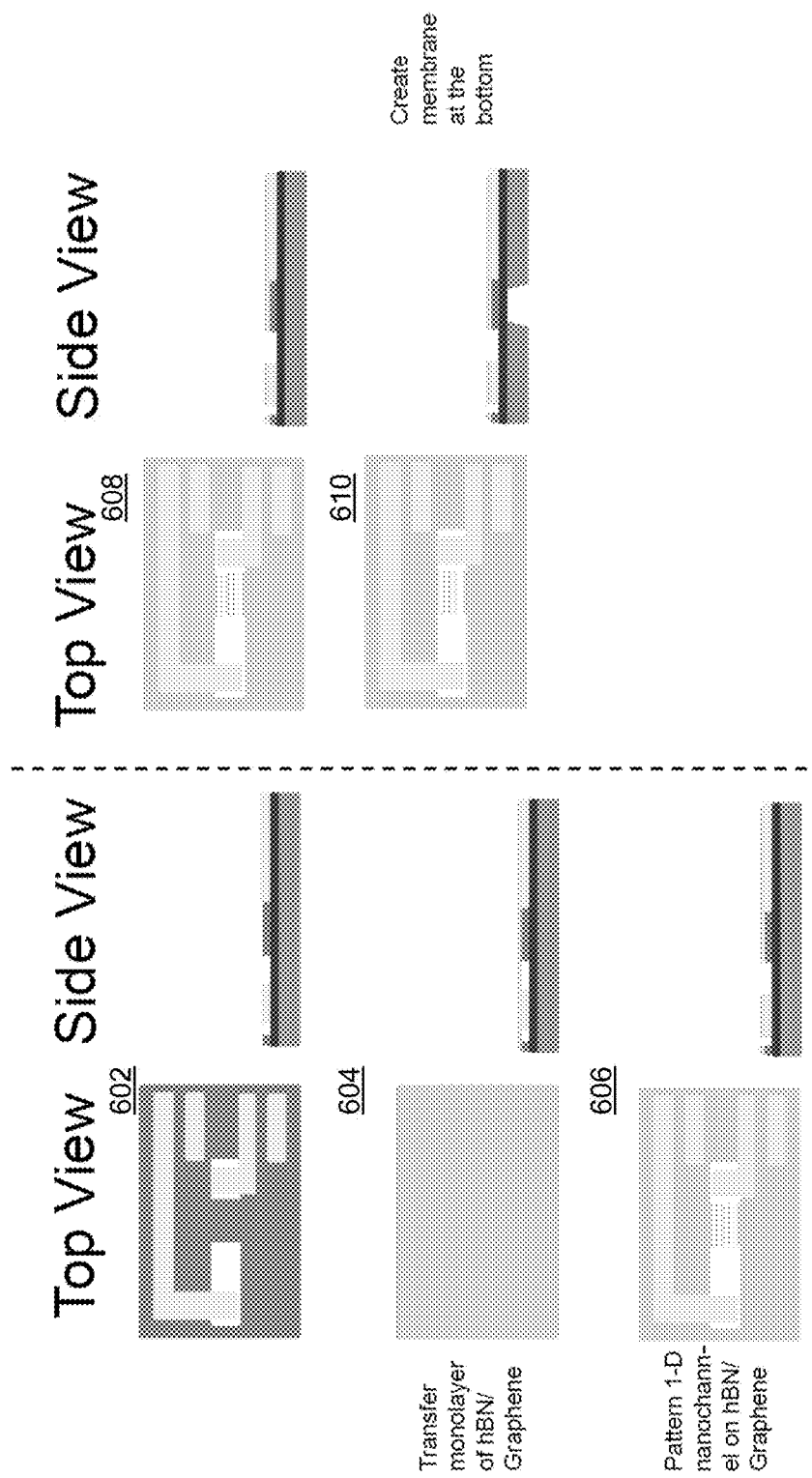
Figure 6:
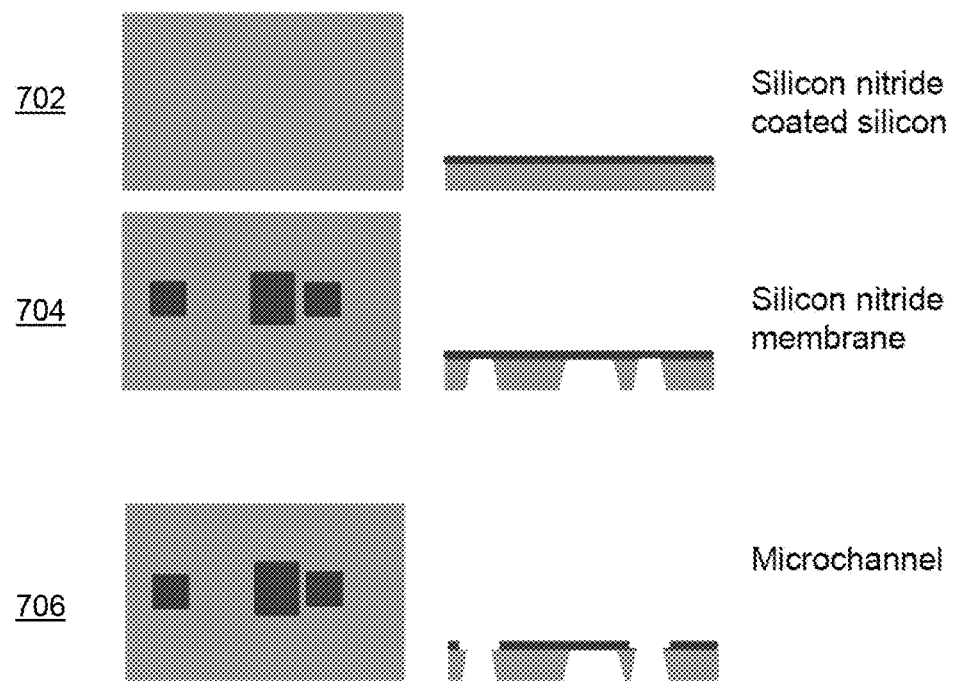
FIG. 6 is a diagrammatic illustration of fabrication of a first component, in accordance with the system of FIGS. 1 and 2.
Figure 7:
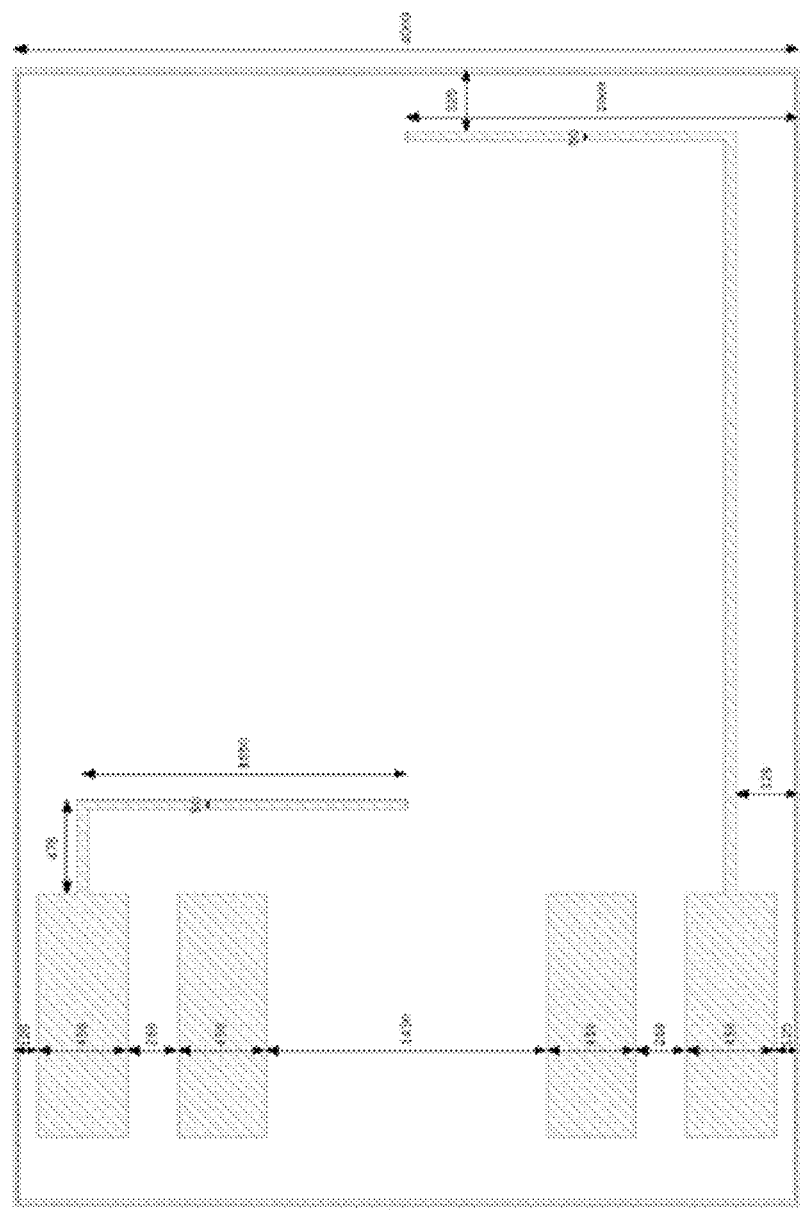
FIG. 7 is an example of a growth substrate, in accordance with the fabrication of FIGS. 4 and 5.
Figure 7:
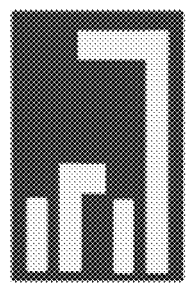

FIGS. 4 to 6 illustrate diagrams of an example fabrication process for the system 100. These diagrams are for illustrative purposes only, as any suitable fabrication approach can be used. FIGS. 4 and 5 illustrate fabrication of the second component 104. At 502, an arbitrary Silicon Nitride substrate, coated in Silicon, is received. At 504, a Chromium or Gold layer is deposited on the substrate using physical vapor deposition. At 506, the Chromium or Gold layer is patterned using photolithography, which serves as an electrical feedthrough for the system 100. FIG. 7 illustrates an example of a pattern for such growth substrate. At 508, the substrate is illustrated after metal patterning.

Figure 8:
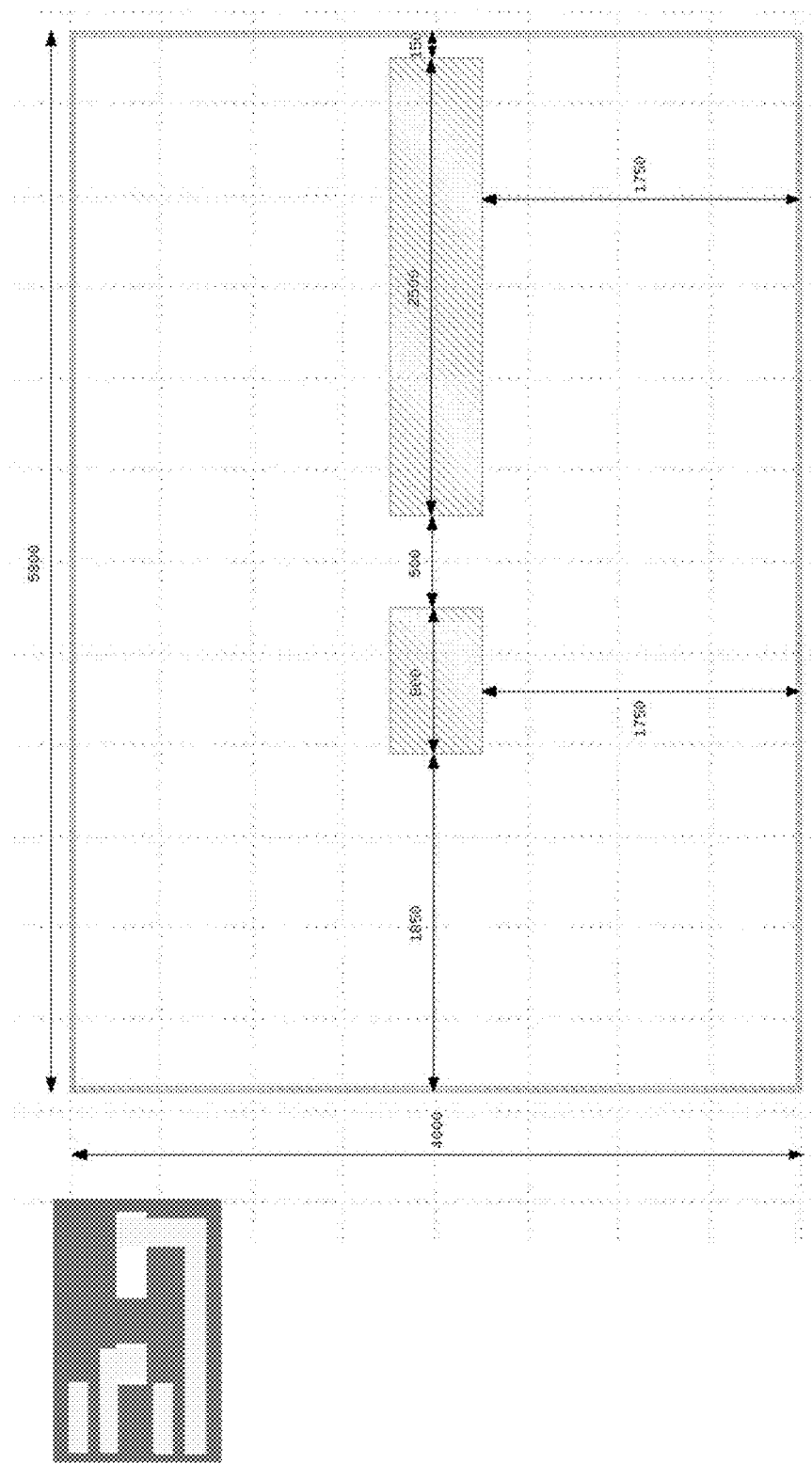
FIG. 8 is an example of a 2D lithography, in accordance with the fabrication of FIGS. 4 and 5.

At 510, a 2D thin film is deposited on the substrate, such as SiO$_2$/Si, using physical vapor deposition. At 512, the film is patterned using photolithography and reactive-ion etching (RIE) to create the microchannels. FIG. 8 illustrates an example of a pattern of such photolithography and reactive-ion etching (RIE).

Figure 9:
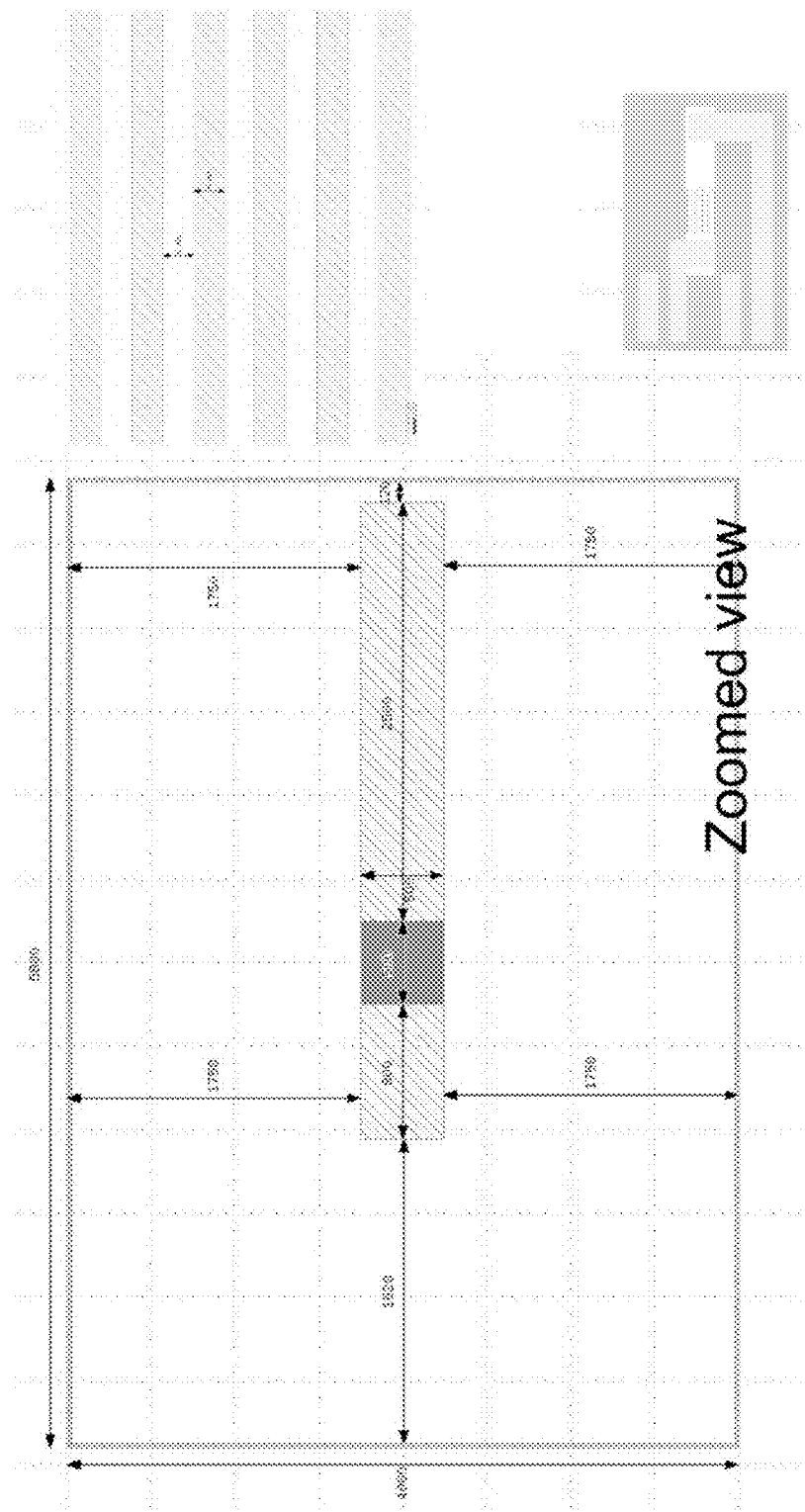
FIG. 9 is an example of reactive-ion etching (RIE) into hBN and graphene, in accordance with the fabrication of FIGS. 4 and 5.
Figure 10:
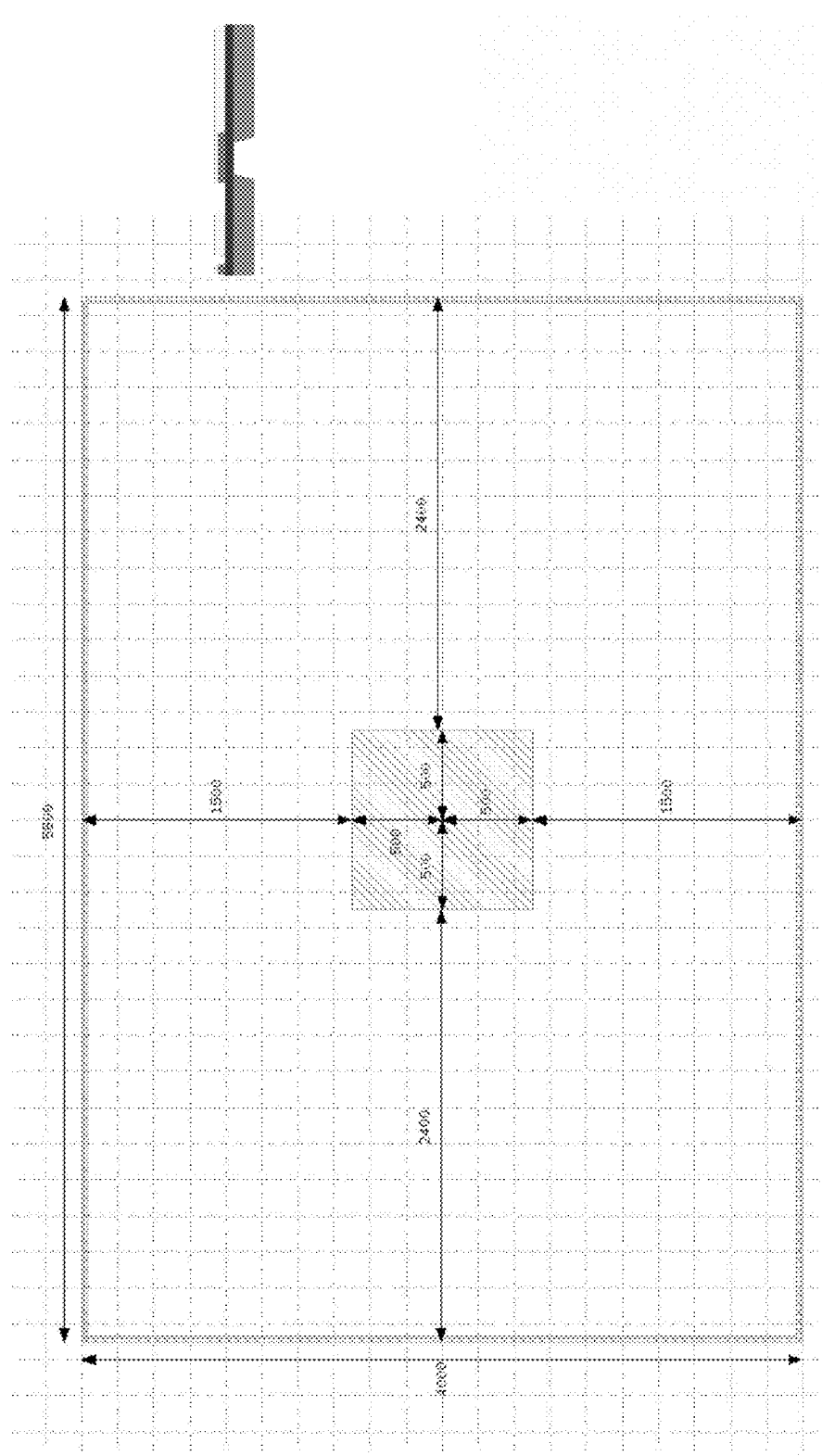
FIG. 10 is an example of a Silicon Nitride membrane, in accordance with the fabrication of FIGS. 4 and 5.

At 602, the substrate with the microchannels is received. To create the angstrom conduits, at 604, a monolayer of hBN and/or graphene is transferred onto the substrate using a dry transfer technique. At 606 and 608, the transferred layer is patterned using photolithography and RIE. FIG. 9 illustrates an example of such patterning. At 610, a small area (such as a few microns) can be etched from the bottom membrane for measurement. FIG. 10 illustrates an example of the etched membrane.

Figure 11:
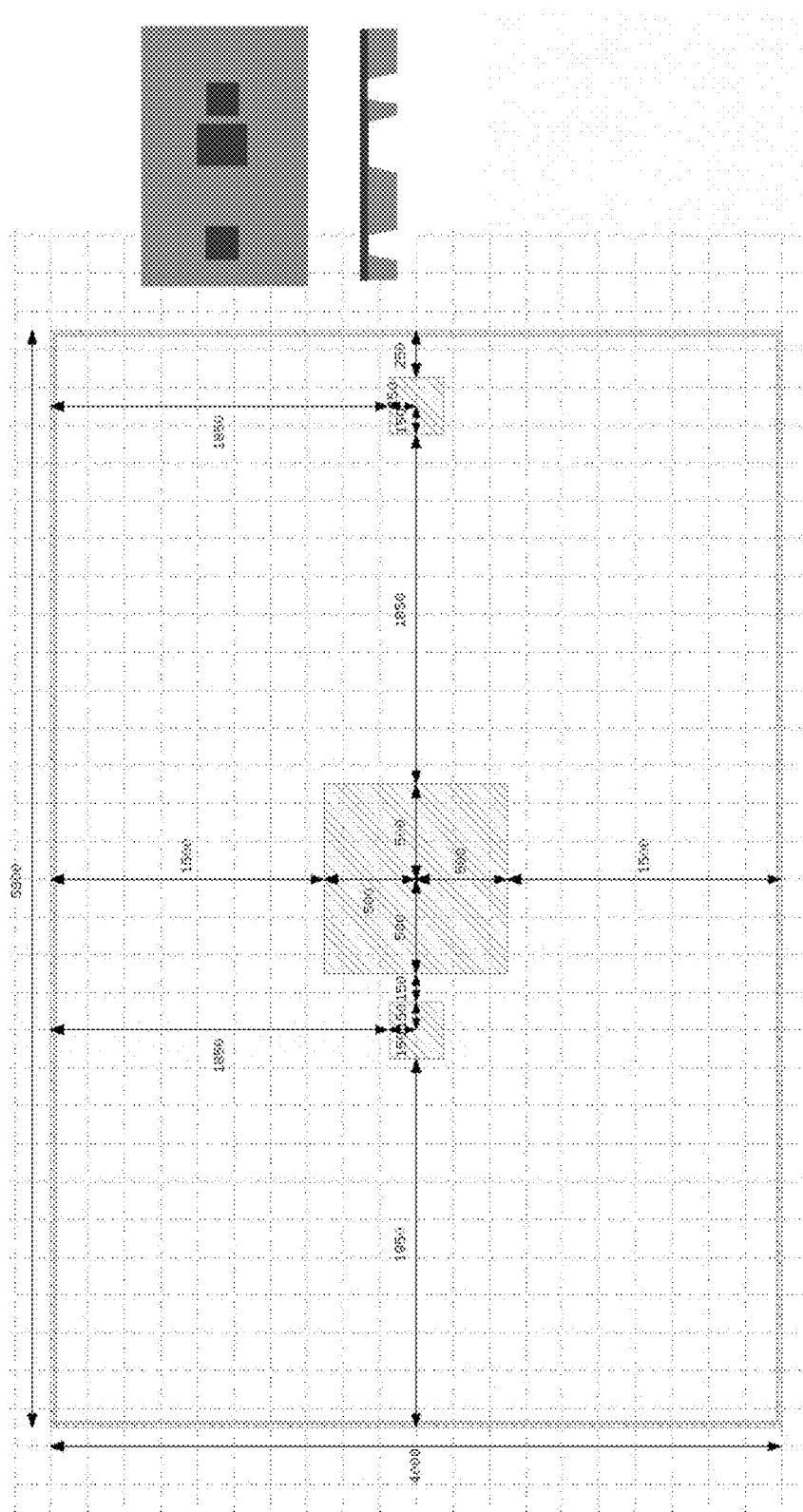
FIG. 11 is an example of a Silicon Nitride membrane, in accordance with the fabrication of FIG. 6.
Figure 12:
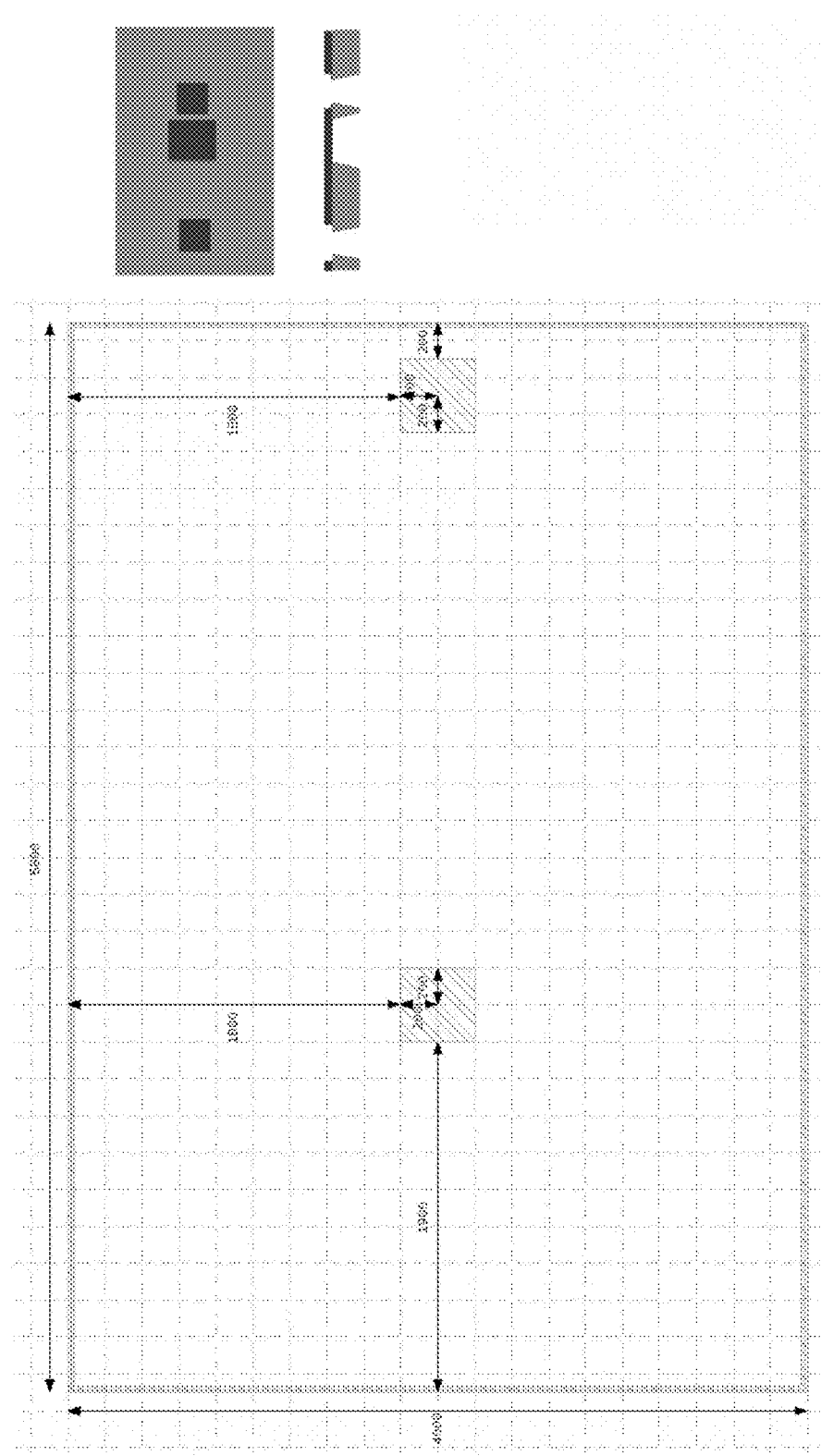
FIG. 12 is an example of patterning for microchannels, in accordance with the fabrication of FIG. 6.

FIG. 6 illustrates fabrication of the first component 102. At 702, a Silicon Nitride substrate, coated in Silicon, is received. At 704, a Silicon Nitride membrane is applied. FIG. 11 illustrates an example of such a membrane. At 706, microchannels are formed in the substrate. FIG. 12 illustrates an example of patterning for such microchannels.

The present inventors conducted example experiments to study the present embodiments. In these experiments, the transport of Cs+ cations in graphene angstrom conduits 133 were studied by conducting molecular dynamics simulations of the electrophoretic motion of Cs+ ions across graphene membranes. The studied embodiments consisted of a graphene membrane separating the two reservoirs. The graphene angstrom conduits 133 were constructed by removing a single graphene layer from a graphite crystal, resulting in membranes with effective pore heights ($h_{eff}$) of 3.4 nm. Both reservoirs contained water and a number of Cs+ cations (along with their correspondent Cl$^-$ anions) chosen to match a concentration of 1 M.

The simulated embodiments consisted of an angstrom confinement assembly comprising graphene membrane comprised of 14 stacked graphene layers (one of which is removed). The graphene membrane had dimensions of: 7.7 nm, 3.4 nm, and 4.8 nm in the x-,y-, and z-directions, respectively. The adjacent graphene layers were stacked in an AB arrangement, with an interlayer distance of 3.4 Å. The carbon atoms at the edges of the graphene layers (corresponding to the entrances of the membrane) were saturated with a hydrogen atom. The edges exposed to the reservoirs corresponded to the armchair edges of the graphene layers. The reservoirs were filled with a 1 M CsCl solution, containing 1776 water molecules, 32 Cs+ cations, and 32 Cl$^-$ anions each. The required water to CsCl ratio was estimated by considering a bulk water density of 1000 kg/m3. Additional water molecules were included to fill the space left by the removed graphene layer. The required number of water molecules may depend on the geometry of the graphene membrane.

Figure 14A:
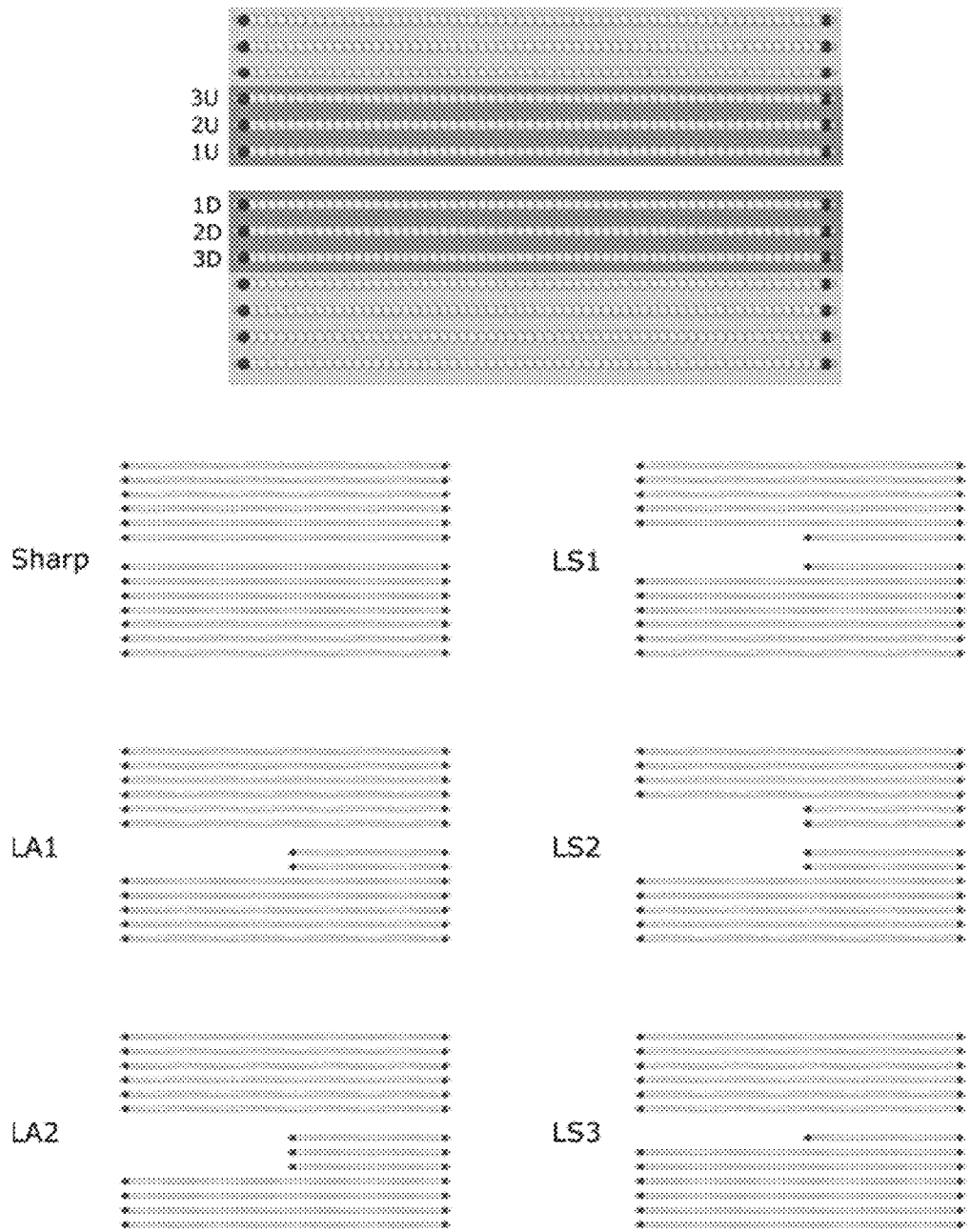
FIGS. 14A and 14B illustrate examples of different entrance geometries to a nanochannel.
Figure 14B:
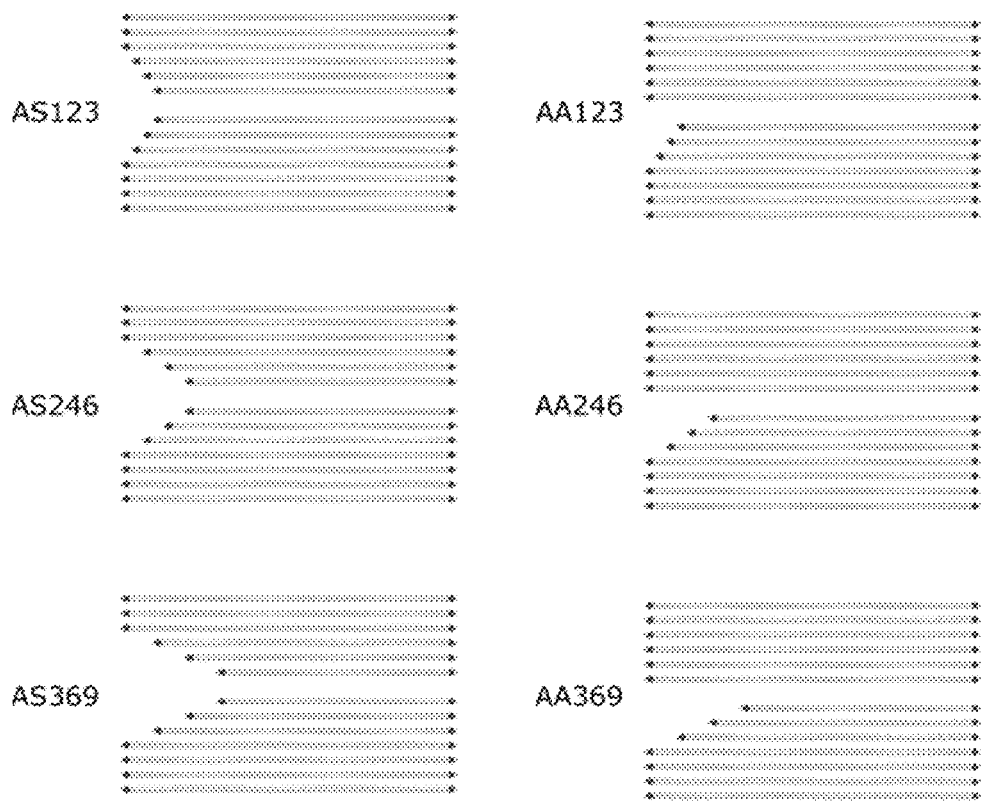

In some cases, different entrance geometries can be created by removing different numbers of rows of carbon atoms from the edges of the internal graphene layers. In this way, rows of carbon atoms are removed from the internal graphene layers (U1, U2, U3, D1, D2, and D3) to create different entrance geometries. Each individual row has a width of ca. 2.46 Å in the x-direction. Five basic geometries are simulated. Each of these geometries is presented in FIGS. 14A and 14B. The number of removed rows for each of the studied geometry cases and denomination are specified in the table below:

| Case Name | 1U | 2U | 3U | 1D | 2D | 3D |
|---|---|---|---|---|---|---|
| Sharp | 0 | 0 | 0 | 0 | 0 | 0 |
| AA123 | 3 | 2 | 1 | 0 | 0 | 0 |
| AA246 | 6 | 4 | 2 | 0 | 0 | 0 |
| AA369 | 9 | 6 | 3 | 0 | 0 | 0 |
| AS123 | 3 | 2 | 1 | 3 | 2 | 1 |
| AS246 | 6 | 4 | 2 | 6 | 4 | 2 |
| AS369 | 9 | 6 | 3 | 9 | 6 | 3 |
| LA1 | 0 | 0 | 0 | 16 | 0 | 0 |
| LA2 | 0 | 0 | 0 | 16 | 16 | 0 |
| LA3 | 0 | 0 | 0 | 16 | 16 | 16 |
| LS1 | 16 | 0 | 0 | 16 | 0 | 0 |
| LS2 | 16 | 16 | 0 | 16 | 16 | 0 |

The simulations of the example experiments were carried out with the Large-scale Atomic/Molecular Massively Parallel Simulator (LAMMPS) software package. The rigid TIP4P/2005 water model was adopted. The van der Waals interactions between atoms were described using a 12-6 Lennard-Jones potential (LJ), with a cutoff distance of 10.0 Å. The electrostatic interactions are accounted for by using the Particle Particle Particle Mesh (PPPM) algorithm. The employed parameters for the different potentials for the non-bonded interactions are summarized in the below table:

| Atom Type | $\sigma_i$ (Å) | $\varepsilon_i$ (kcal/mol) | $q_i$ (e) |
|---|---|---|---|
| O | 3.1589 | 0.1852 | 0.0 |
| H | 0.0 | 0.0 | 0.5564 |
| M | 0.0 | 0.0 | −1.1128 |
| C | 3.39967 | 0.086 | 0 |
| $C_{CH}$ | 2.985 | 0.046 | −0.115 |
| $H_{CH}$ | 2.42 | 0.0301 | 0.115 |
| Cl$^-$ | 4.92 | 0.0116615 | −1 |
| Cs$^+$ | 3.36 | 0.3944318 | 1 |

The LJ parameters for the interactions between the different pairs of atoms are obtained by employing Lorentz-Berthelot combining rules ($\sigma_{ij}=(\sigma_i+\sigma_j)/2$; $\varepsilon_{ij}=\sqrt{\varepsilon_i\varepsilon_j}$). The systems were equilibrated over 1 ns in the NPT ensemble at a temperature of 300 K and pressure of 1 bar. Following, at least 50 ns were simulated in the NVT ensemble at a temperature of 300 K. Equations of motion were integrated with a time step of 2 fs, and temperature control was achieved by employing a Nosé-Hoover thermostat with a coupling constant of 0.2 ps. The positions of the atoms corresponding to the membrane were kept fixed. During this last step, the electrophoretic motion of the ions across the membrane was achieved by applying a constant electric field (E) to water and ions. The applied electric field had a magnitude between 107 and 5×107 V/m (different cases were simulated with different E).

Figure 15:
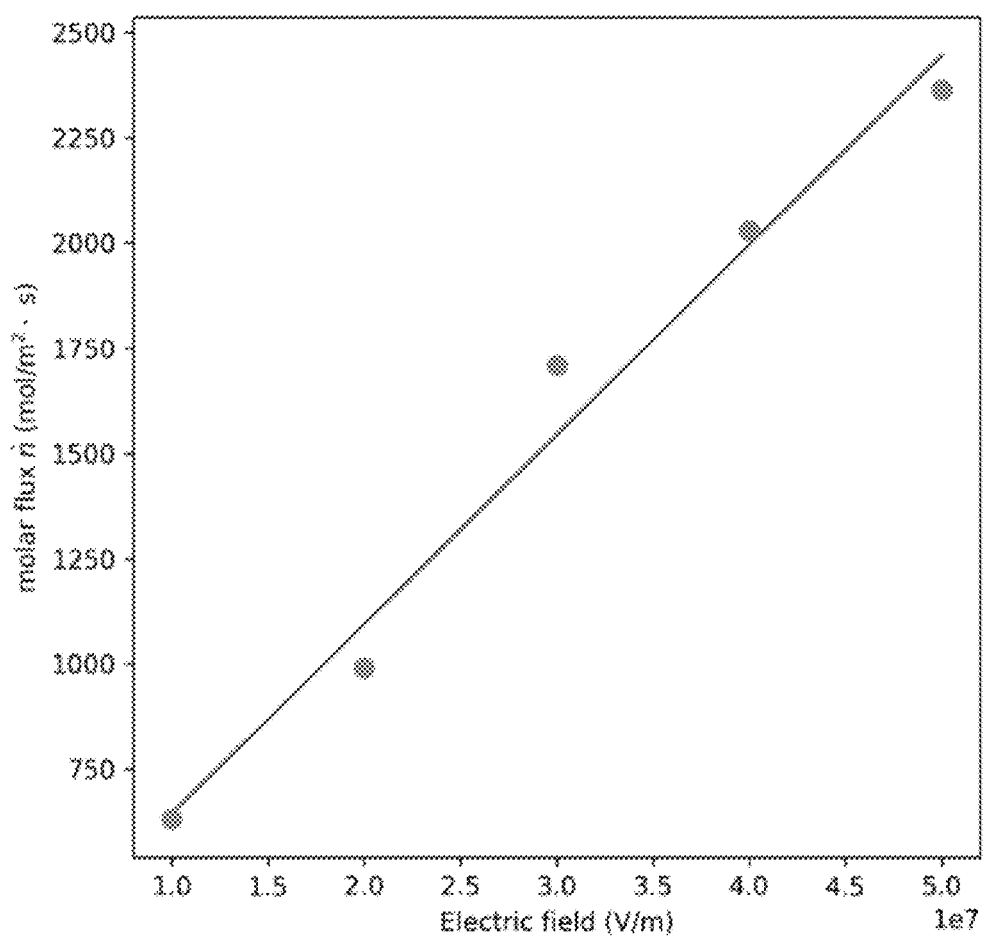
FIG. 15 is a chart showing molar flux $\dot{n}$ as a function of an applied electric field E, in accordance with example experiments of the system of FIG. 2.
Figure 16:
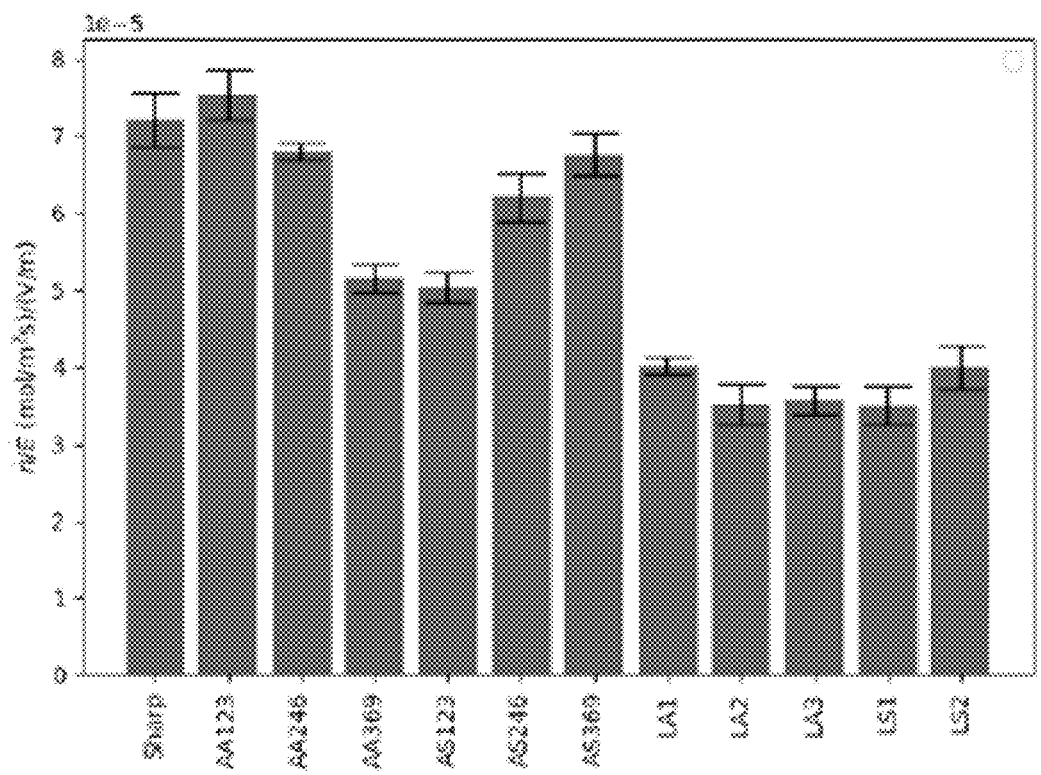
FIG. 16 is a chart showing $\dot{n}/E$ ratio for all geometries, in accordance with example experiments of FIG. 15.
Figure 17A:
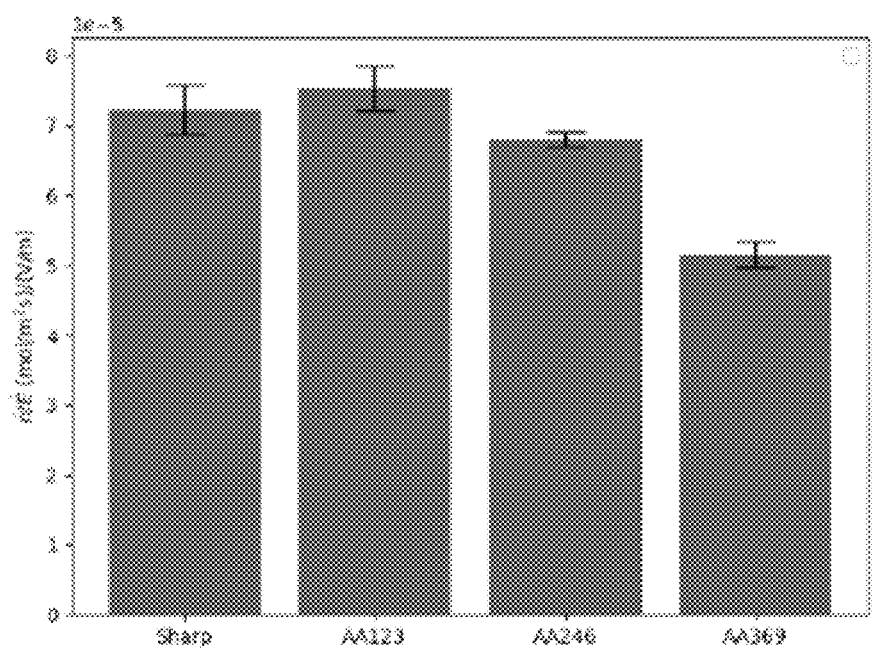
FIG. 17A is a chart showing $\dot{n}/E$ ratio for the membranes type AA, in accordance with example experiments of FIG. 15.
Figure 17B:
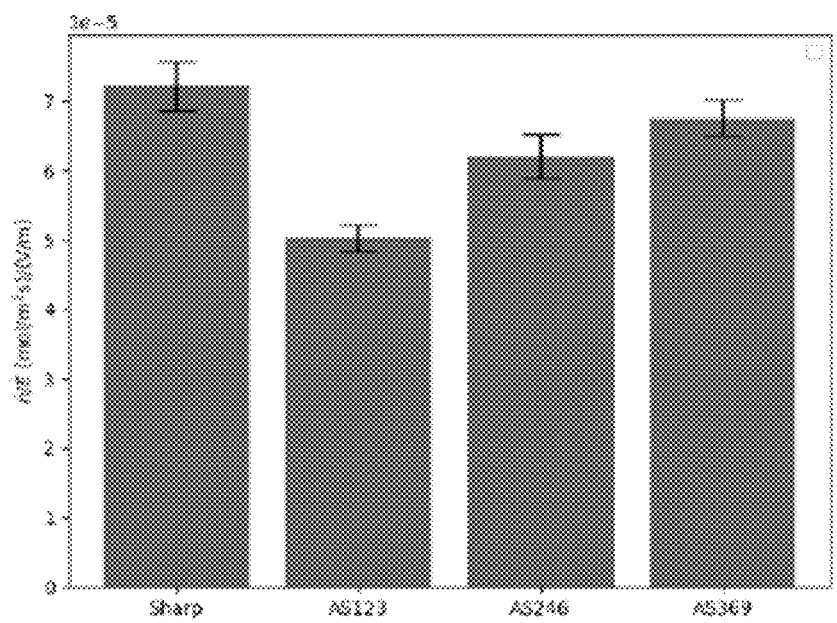
FIG. 17B is a chart showing $\dot{n}/E$ ratio for the membranes type AS, in accordance with example experiments of FIG. 15.
Figure 17C:
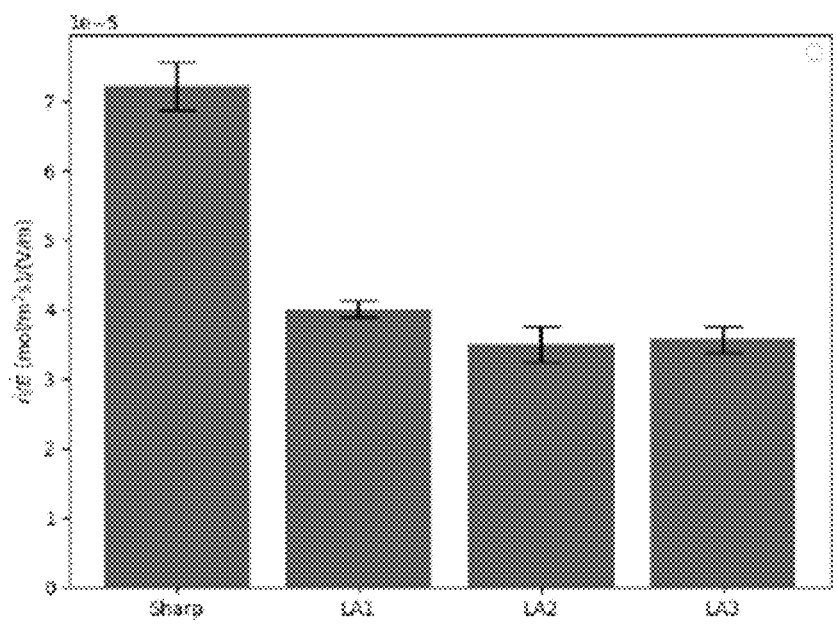
FIG. 17C is a chart showing $\dot{n}/E$ ratio for the membranes type LA, in accordance with example experiments of FIG. 15.
Figure 17D:
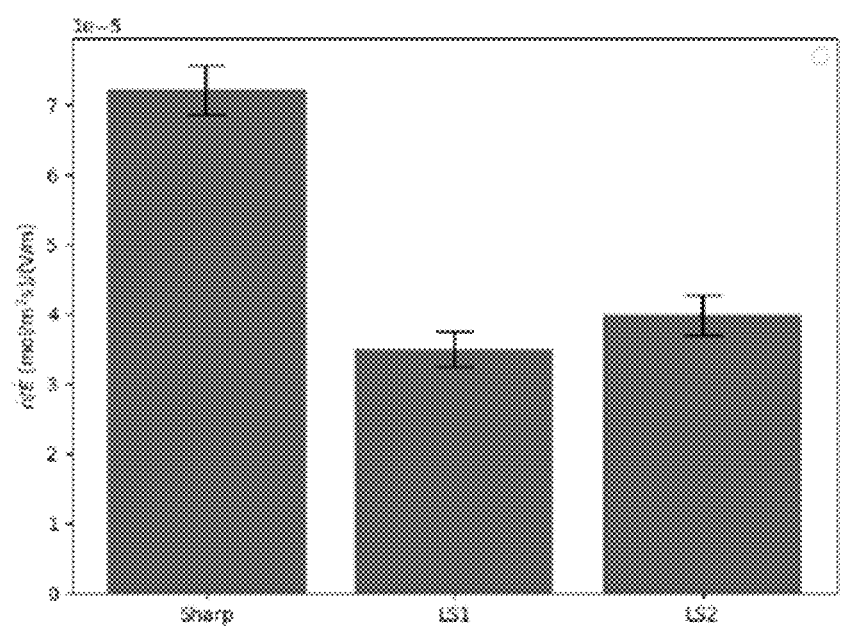
FIG. 17D is a chart showing $\dot{n}/E$ ratio for the membranes type LS, in accordance with example experiments of FIG. 15.

In the example experiments, the transport of Cs+ is characterized by the average molar flux across the membrane ṅ. The ṅ is computed by computing the number of cations that cross the membrane over a period of time. In an example experiment with a membrane geometry type sharp, ṅ as a function of the applied E are presented in FIG. 15. For comparison purposes, a linear fit is applied to the computed ṅ. The calculated slopes (ṅ/E ratio) for all of the studied cases are presented in FIG. 16. In this figure, it can be observed that different slopes are computed for the different entrance geometries. Such a behavior suggests that the transport of Cs+ is affected by the geometry of the pore. When comparing the cases type AA, it can be observed that as the entrance angle decreases (from 90° for the case type sharp to 28.1° for the case type AA369), the slope decreases.

Therefore, suggesting that for this geometry, the membrane becomes less efficient with the decrease of the entrance angle. Interestingly, for the cases type AS, a decrease on the entrance angle produces an increase in the slope, suggesting that the membrane becomes more efficient as the entrance angle decreases. Furthermore, it can be observed that the cases type LA and LS present similar slopes, suggesting that both geometries are similarly efficient to the transport of Cs+. The slopes for each geometry, compared to the case type sharp, are presented in FIGS. 17A, 17B, 17C, and 17D.

The present embodiments provide a number of substantial advantages over other approaches, for example:
- simpler/easy to use: the system is small and there are no complex modules to operate;
- easier to manufacture and handle;
- cost: as the system is based on micro/nanofabrication technology, the cost of the device will be cheaper as a number of chips can be produced in bulk on one wafer;
- small footprint: the system can be made of micro/nanofabricated chips and use microelectrodes to connect for electrical sources, without having to use high vacuum or bulky systems;
- lightweight: the system is made of micro/nanofabricated chips, which are very lightweight;
- less power requirements: the small size of the system, no requirement for a vacuum, and the use of microelectrodes means the system uses less power to trap the ions; and
- multiple ion trapping.

The present embodiments can have a number of suitable uses, for example, fundamental research applications (such as controlling quantum states) and commercial applications. In particular, the present embodiments are applicable to building accurate and portable mass spectrometer systems, high performance quantum computers, highly efficient water desalination systems, and the like. In addition, the present embodiments can be used to trap and identify a single DNA molecule for analysis.

Although the invention has been described with reference to certain specific embodiments, various modifications thereof will be apparent to those skilled in the art without departing from the spirit and scope of the invention as outlined in the claims appended hereto.

The invention claimed is:

1. A system for angstrom confinement of ions, the system comprising:
a first reservoir configured to receive ionic compounds from which the ions can be separated and water molecules to support electroosmosis;
a second reservoir in fluid communication with the first reservoir by a microchannel therebetween;
a first electrode positioned in or adjacent to the microchannel proximate the first reservoir;
a second electrode positioned in or adjacent to the microchannel proximate the second reservoir;
wherein the first and second electrodes are configured to form an electric field therebetween for electroosmosis of the ionic compounds; and
an angstrom confinement assembly positioned in the microchannel between the first and second reservoirs and the first and second electrodes for trapping the ions, wherein the angstrom confinement assembly comprises a plurality of spacers disposed in spaced relation one to the next to define plural angstrom conduits between respective ones of each adjacent pair of the spacers, wherein the angstrom conduits have prescribed angstrom-order heights to confine the ions and the water molecules to respective linear chains therein;
whereby, when said electric field is formed, positive ions of the ionic compounds are separated from negative ions of the ionic compounds by inducing the positive ions to flow through the angstrom conduits, the positive ions being separated by the water molecules in the respective linear chains within the angstrom conduits, and when said electric field is not formed, water molecules flow into the angstrom conduits due to capillary forces to confine the positive ions in the respective linear chains in the angstrom conduits.

2. The system of claim 1, further comprising:
a first component defining the first reservoir and the second reservoir; and
a second component bonded to the first component, the first component and the second component defining the microchannel therebetween for fluidically connecting the first reservoir and the second reservoir.

3. The system of claim 2, wherein the first component and the second component each comprise substrates comprised of Silicon Dioxide coated Silicon or Silicon Nitride coated Silicon.

4. The system of claim 1, wherein the angstrom confinement assembly comprises a plurality of atomically flat spacers with apertures in the layers defining the angstrom conduits.

5. The system of claim 4, wherein the spacers are comprised of hexagonal Boron Nitride (hBN).

6. The system of claim 4, wherein the spacers are comprised of graphene.

7. The system of claim 4, wherein the angstrom confinement assembly is fabricated by stacking the atomically flat spacers together using van der Waals forces.

8. The system of claim 7, wherein the angstrom confinement assembly is patterned using reactive-ion etching (RIE).

9. The system of claim 1, wherein the first reservoir is configured to receive Cesium Chloride or Sodium Chloride defining the ionic compounds.

10. The system of claim 1, wherein the first and second electrodes are configured to form the electric field such that the first electrode operates as an anode and the second electrode acts as a cathode.

11. The system of claim 1, further comprising a measurement accessway between the first and second reservoirs and registered with the angstrom confinement assembly for permitting optical measurement of the angstrom confinement assembly.

12. The system of claim 1, wherein the prescribed angstrom-order height of each angstrom conduit is 3.4 Å.

* * * * *